Patented Nov. 15, 1949

2,488,253

UNITED STATES PATENT OFFICE 2,488,253

BASIC THIO ESTERS

Eugene H. Woodruff, Kalamazoo, Mich., assignor to The Upjohn Company, Kalamazoo, Mich., a corporation of Michigan No Drawing. Application May 20, 1946, Serial No. 671,118

5 Claims. (Cl. 260—455)

This invention relates to certain esters of phenylthiolacetic acid, and is more particularly concerned with compounds of the following formula:

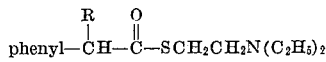

wherein R is selected from the group consisting of cyclopentyl and cyclopentenyl radicals.

Members of this new group of compounds have been prepared, isolated, and found to possess utility as antispasmodics. The free basic esters of the compounds herein concerned are usually obtained as oily liquids, readily soluble in many common organic solvents and difficulty soluble in water. Acid and quaternary ammonium salts of these basic esters are generally crystalline solids at ordinary temperatures.

The esters with which the present invention is concerned possess the neurotropic characteristic of atropine and the musculotropic characteristic of papaverine, the combination of these properties making them especially useful as antispasmodics.

It is known that atropine acts upon smooth muscle tissues to relieve spasm originated by or produced through the autonomic nervous system; thus atropine is considered a neurotropic agent. Papaverine, an opium alkaloid, is capable of acting upon smooth muscle tissues directly to relieve spasm intrinsic in the smooth muscle tissue itself, and such an agent is called musculotropic. In clinical practice, it is not always possible to determine the type of spasm present. Furthermore, both types may be present simultaneously, presenting a situation in which an antispasmodic which is effective against only a single type is obviously of limited utility.

By the present invention I have produced compounds which possess both types of antispasmodic action to a sufficient degree to render them useful in treating either type of spasm, or both simultaneously if they should be present. The esters of my invention may be prepared by the reaction of a suitable active acid derivative, such as the acid chloride, with beta-diethylaminothioethanol. The position of the sulfur atom in esters produced by this method is definitely fixed, as there is but a single structure theoretically possible for beta-diethylaminothioethanol. The compounds may be separated as the free basic ester, or they may be converted to the corresponding acid or quaternary ammonium salt.

The following examples illustrate several ways in which members of the new group of compounds may be prepared, but are in no way to be construed as limiting.

Example 1

Thirty-three and seven-tenths grams (0.167 mole) of phenyl - (delta - 2) - cyclopentenylacetic acid, prepared from phenyl malonic ester and (delta-2)-cyclopentenyl chloride and melting at 71 degrees centigrade, was converted to the acid chloride by refluxing with 71.4 grams (0.6 mole) of thionyl chloride for two hours, after which the excess thionyl chloride was removed by distillation in vacuo. Three fifty-milliliter portions of dry benzene were added, the benzene being removed by vacuum distillation after each addition to insure freedom from thionyl chloride.

Twenty-two and two-tenths grams (0.17 mole) of beta-diethylaminothioethanol (2-diethylaminoethanethiol, in 50 milliliters of xylene was added to the cooled acid chloride in 100 milliliters of xylene in one portion, whereafter the reaction mixture was refluxed for one-half hour. The cooled reaction mixture was poured into 500 milliliters of water, the xylene removed, and the aqueous solution extracted with ether. The aqueous layer was separated and made basic with sodium carbonate solution, the oil was extracted with ether, the ether solution separated and dried, the ether removed, and the residual oil distilled. This oil was the free basic diethylaminothioethyl phenyl-(delta-2)-cyclopentenylacetate, which is also designated as 2-diethylamino ethyl phenyl-(delta - 2)-cyclopentenylthiolacetate, boiling at 144–149 degrees centigrade at 0.09 millimeter of mercury pressure absolute.

The free basic ester was analysed and found to correspond to the theoretical percentages. The analysis is as follows—

Calc'd: C, 71.88; H, 8.57; S, 10.10; N, 4.41. Found: C, 71.54; H, 7.95; S, 9.79; N, 4.87.

The free basic ester was treated with a slight excess of alcoholic hydrogen chloride to prepare the salt. The alcohol was removed in vacuo and the residue was recrystallized from a mixture (1:1) of benzene and anhydrous ether. The hydrochloride of diethylaminothioethyl phenyl-(delta-2)-cyclopentenylacetate melted at 103–105 degrees centigrade. Analysis—

Calc'd: C, 64.84; H, 7.45; N, 3.98; S, 9.11; Cl, 10.08. Found: C, 64.39; H, 7.76; N, 4.81; S, 9.57; Cl, 9.93.

Example 2

Thirty-four grams (0.167 mole) of phenylcyclopentyl-acetic acid, obtained by the catalytic reduction of phenylcyclopentenylacetic acid, was converted to the acid chloride after the manner of Example 1. The acid chloride was reacted with 22.2 grams (0.172 mole) of beta-diethylaminothioethanol (2-diethylamino ethanethiol) and the product isolated as in Example 1. The free basic ester, beta - diethylaminothioethyl phenylcyclopentylacetate, which is also designated as 2 - diethylaminoethylphenylcyclopentylthiolacetate, boiled at 133–140 degrees centigrade at 0.1 millimeter of mercury pressure absolute and analysed as follows—

Calc'd: C, 71.43; H, 9.16; N, 4.38; S, 10.03. Found: C, 71.30; H, 9.21; N, 5.02; S, 7.22.

The hydrochloride of the basic ester, prepared as in Example 1 and crystallized from a mixture of benzene and ether, melted at 106–108 degrees centigrade. Analysis of beta-diethylaminothioethyl phenylcyclopentylacetate hydrochloride—

Calc'd: C, 64.47; H, 7.97; N, 3.96; S, 9.06; Cl, 10.02. Found: C, 64.72; H, 8.29; N, 3.97; S, 8.79; Cl, 10.21.

By virtue of the amino nitrogen atom common to the esters of this invention, they are all basic compounds and form stable salts with acids. As it is the basic portion of the salt molecule, and not the acidic portion, in which the antispasmodic activity appears to reside, the nature of the acid employed is merely a matter of convenience, and is usually chosen with regard for the degree of crystallinity of the salt produced. The acid portion of such a salt may be varied widely without materially affecting antispasmodic activity, the only limitation being that the anion of the acid be reasonably non-toxic. Other acid salts which may be prepared include the citrate, tartrate, hydrosulfate, hydrobromide, acetate, et cetera. Quaternary ammonium salts of the esters may also be produced by treatment of the basic ester with the desired alkyl halide or arylsulfonic ester, and such include the methobromide, ethochloride, ethyl (paratoluene) sulfonate, et cetera.

I claim:

1. A basic di-substituted thiolacetic acid ester derivative of the group consisting of the esters and essentially non-toxic acid salts and quaternary ammonium salts with alkyl halides and arylsulfonic acids of esters having the formula:

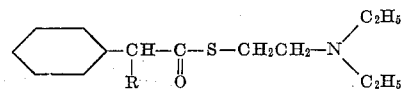

in which R is a radical of the group consisting of cyclopentyl and (delta-2)-cyclopentenyl radicals.

2. A beta-diethylaminothioethyl phenlyclopentenylacetate.
3. Beta-diethylaminothioethyl phenyl-(delta-2)-cyclopentenylacetate.
4. Beta-diethylaminothioethyl phenylcyclopentylacetate hydrochloride.
5. Beta-diethylaminothioethyl phenyl-(delta-2)-cyclopentenylacetate hydrochloride.

EUGENE H. WOODRUFF.

REFERENCES CITED

The following references are of record in the file of this patent:

UNITED STATES PATENTS

| Number | Name | Date |
|---|---|---|
| 2,390,555 | Richardson | Dec. 11, 1945 |